US011474741B1

(12) United States Patent
Farhan et al.

(10) Patent No.: US 11,474,741 B1
(45) Date of Patent: Oct. 18, 2022

(54) STORAGE DEVICE WRITE BARRIERS

(71) Applicant: Amazon Technologies, Inc., Seattle, WA (US)

(72) Inventors: Munif M. Farhan, Bellevue, WA (US); Keun Soo Jo, Bellevue, WA (US); James Alexander Bornholt, Seattle, WA (US); Andrew Kent Warfield, Vancouver (CA); Andrew C. Schleit, Seattle, WA (US); Seth W. Markle, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1 day.

(21) Appl. No.: 16/916,988

(22) Filed: Jun. 30, 2020

(51) Int. Cl.
 *G06F 3/06* (2006.01)
 *G06F 9/30* (2018.01)
 *G06F 9/54* (2006.01)

(52) U.S. Cl.
 CPC .......... *G06F 3/0659* (2013.01); *G06F 3/0604* (2013.01); *G06F 3/0644* (2013.01); *G06F 3/0653* (2013.01); *G06F 3/0656* (2013.01); *G06F 3/0673* (2013.01); *G06F 9/30047* (2013.01); *G06F 9/546* (2013.01)

(58) Field of Classification Search
 CPC .............................. G06F 3/0673; G06F 3/0659
 See application file for complete search history.

(56) References Cited

U.S. PATENT DOCUMENTS

| 9,405,709 | B1* | 8/2016 | Salpekar | ............... | G06F 3/0614 |
| 2007/0168626 | A1* | 7/2007 | De Souza | ........... | G06F 12/0804 |
| | | | | | 711/E12.04 |
| 2009/0006787 | A1* | 1/2009 | De Souza | ............. | G06F 3/0659 |
| | | | | | 711/156 |
| 2017/0351433 | A1* | 12/2017 | Walker | ................ | G06F 12/0246 |

\* cited by examiner

*Primary Examiner* — Edward J Dudek, Jr.
(74) *Attorney, Agent, or Firm* — Klarquist Sparkman, LLP

(57) ABSTRACT

Technologies are provided for supporting storage device write barriers. A host computer can be configured to transmit a write barrier command to a storage device to indicate that one or more data access commands should be processed before one or more other data access commands are processed. For example, a host computer can transmit one or more data access commands to a storage device. The host computer can then transmit a write barrier command to the storage device. The storage device can be configured to receive the write barrier command and to associate a write barrier with the one or more data access commands. The host computer can continue to transmit additional data access commands to the storage device. However, the storage device will not process the additional data access commands until after the one or more data access commands associated with the write barrier have been processed.

21 Claims, 8 Drawing Sheets

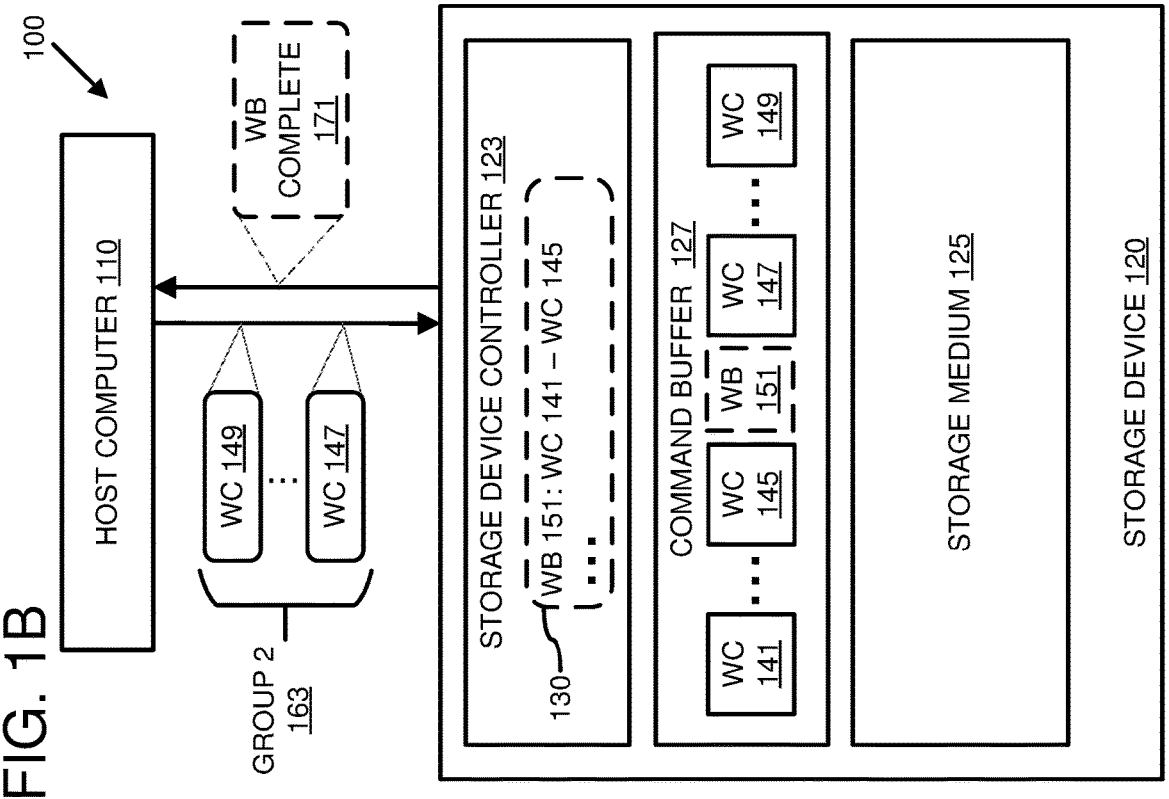
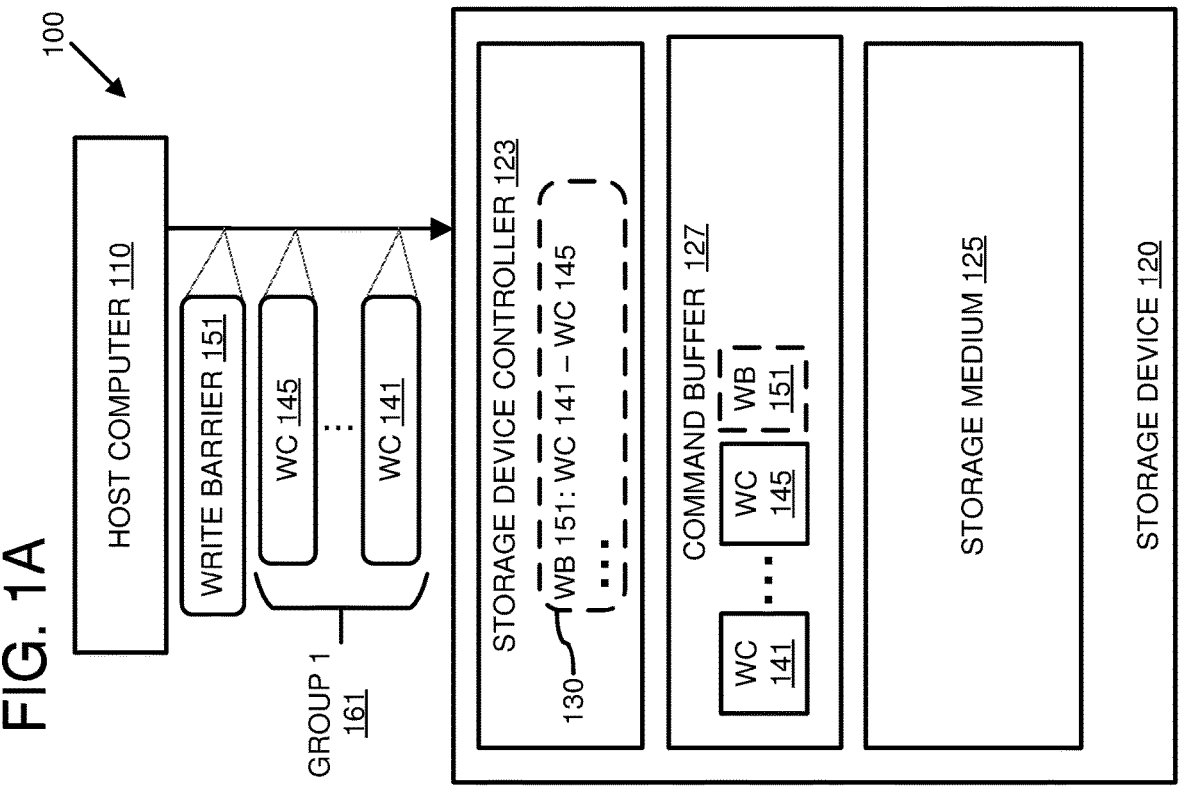

STORAGE DEVICE WRITE BARRIERS

BACKGROUND

At least some storage devices can process data access commands out of order. For example, a storage device that supports out of order processing can receive a plurality of data access commands in one order and process the data access commands in a different order. Some such storage devices can reorder data access commands in an attempt to improve the efficiency of the command processing.

BRIEF DESCRIPTION OF THE DRAWINGS

FIGS. 1A-B are system diagrams depicting an example system configured to process storage device write barrier commands.

DETAILED DESCRIPTION

Figure 2:
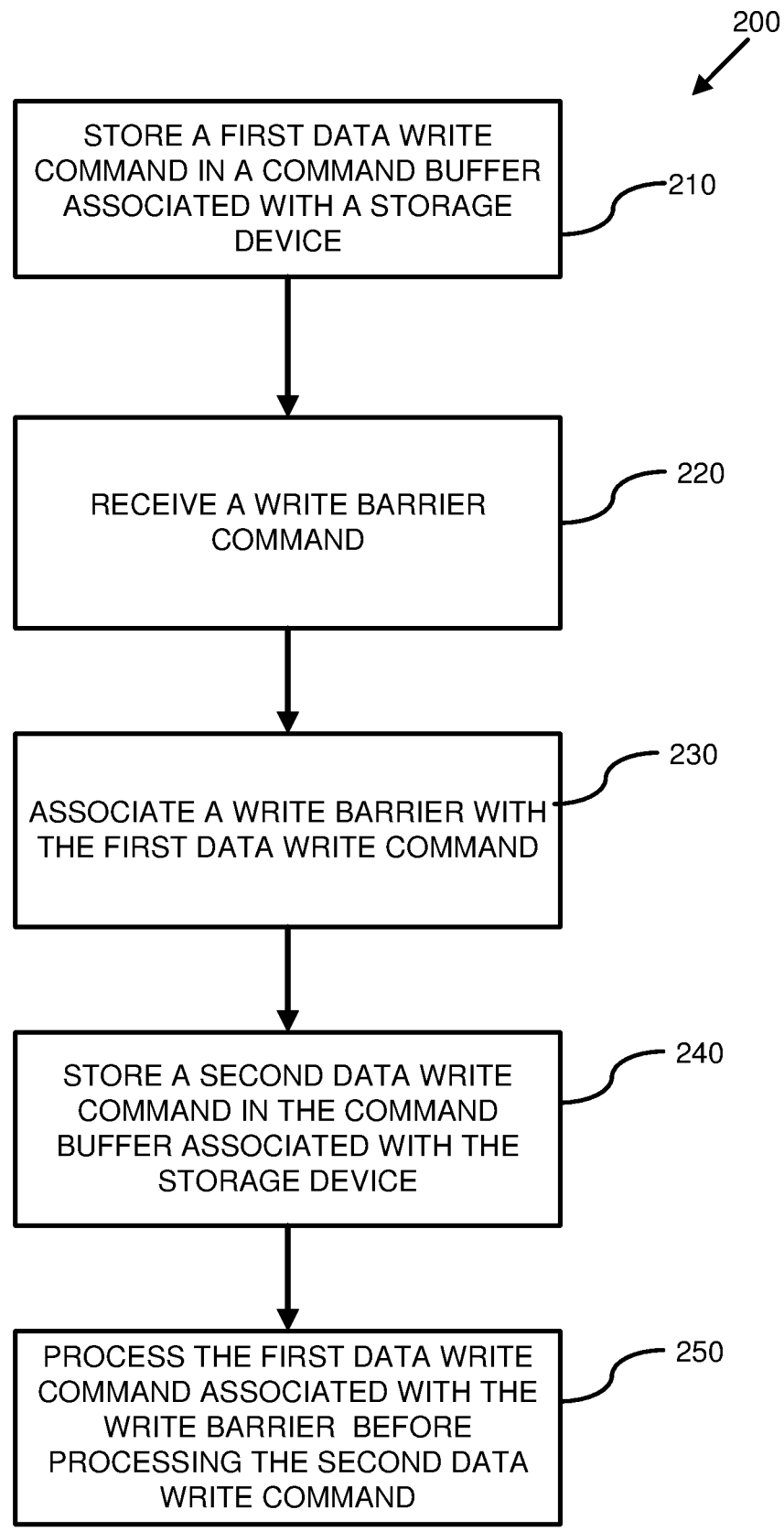
FIG. 2 is a flowchart of an example method for processing a write barrier command.

Some storage devices can process data access commands in a different order than an order that the data access commands are sent to the storage devices. For example, a storage device may determine that certain data access commands can be processed more efficiently in a different order than the order in which the commands were received. Such a determination can be based on a current position of a read/write head of the storage device, relative positions of storage locations targeted by the data access commands, and/or other considerations.

However, in at least some scenarios, a host computer transmitting data access commands to a storage device may wish to ensure that the storage device does not reorder the data access commands. For example, in a scenario where a host computer maintains an index and data referenced by the index, the host computer may wish to ensure that data write commands to add new data are processed before data write commands to update the index to reference the new data. However, if there is a possibility that the storage device will reorder the data write commands, then the host computer must wait to transmit the commands to update the index until after it receives confirmation that the commands to update the data have been processed. This can be problematic because it is possible that the host computer may fail after sending the commands to update the data, but before sending the commands to update the index. This can leave the index in an inconsistent state. Thus, in at least some scenarios, it can be difficult, if not impossible, for the host computer to treat the update of the data and the related index as a single, atomic operation.

Additionally or alternatively, a host computer may be in a position to determine a better overall order of data command processing than a storage device. For example, in a scenario where data is stored in multiple zones of a storage device and a host computer has a batch of data access commands to transmit to the storage device, the host computer may be able to group data access commands in the batch based on the zones that are targeted by the data access commands. The host computer can transmit data access commands targeting one storage zone before transmitting data access commands targeting another storage zone. However, it is possible that the storage device will ignore this ordering and process the data access commands in a different order. The storage device may think it is processing the data access commands in an efficient manner but, because it has not considered (or even received) all the data access commands in the batch, it is possible the storage device will choose an ordering that is less efficient than the zone-based ordering created by the host computer.

Additionally or alternatively, a host computer may be responsible for performing garbage collection operations (such as defragmentation, data compaction, zone reclamation, etc.) for a storage device. The host computer may wish for the storage device to process data access commands related to the garbage collection operations before processing any other data access commands targeting data that is targeted by the garbage collection operations. If it is possible that the storage device will process data access commands out of order, then the host computer must wait until it receives confirmation that the garbage collection-related data access commands have been processed before sending the other data access commands to the storage device. This can introduce overhead in the host computer because it must maintain the pending data access commands in an internal buffer while it waits for confirmation from the storage device that the garbage collection-related operations have completed. In at least some scenarios, this can also introduce data loss since there is a risk that the pending data access commands will be lost if the host computer fails before transmitting the pending data access commands to the storage device.

At least some of the technologies described herein can be used to address these problems. A host computer can be configured to transmit a write barrier command to a storage device to indicate that one or more related data access commands should be processed before one or more other data access commands are processed. For example, a host computer can transmit one or more data access commands to a storage device. The host computer can then transmit a write barrier command to the storage device. The storage device can be configured to receive the write barrier command and associate a write barrier with the one or more data access commands. The host computer can continue to transmit additional data access commands to the storage device; however, the storage device will not process the additional data access commands until after the one or more data access commands associated with the write barrier have been processed.

In at least some embodiments, a storage device can comprise a command buffer where data access commands are temporarily stored before they are processed by a storage device controller of the storage device. The storage device controller can be configured to receive one or more data access commands and to store them in the command buffer. The storage device controller can then receive a write barrier command and can process the write barrier command by associating the one or more data access commands in the command buffer with a write barrier. The storage device controller can continue to receive additional data access commands and to store the additional data access commands in the command buffer. However, when processing the data access commands from the command buffer, the storage device controller will process all the data access commands associated with the write barrier before processing any of the additional data access commands that were received after the write barrier command.

Thus, in at least some scenarios, a host computer can use write barrier commands to ensure that certain data access commands are processed by a storage device before other data access commands. In at least some embodiments, the host computer can transmit multiple write barrier commands to a storage device. For example, the host computer can separate multiple groups of data access commands with write barrier commands in order to dictate an order to the storage device in which the groups of data access commands should be processed. In at least some such embodiments, the storage device can still process data access commands within a given group in an order that is different from the order in which the data access commands in the group are transmitted to the storage device.

FIG. 1A is a system diagram depicting an example system 100 configured to process storage device write barrier commands (e.g., 151). The example system 100 comprises a storage device 120. The storage device 120 comprises a storage medium 125, a command buffer 127, and a storage device controller 123. The example system 100 further comprises a host computer 110 that is connected to the storage device 120. The host computer 110 can be connected to the storage device 120 via one or more wired and/or wireless communication channels.

The host computer 110 can be configured to transmit a group of data write commands 161 to the storage device 120. A data write command can comprise one or more instructions to store data in the storage medium 125 of the storage device 120. In at least some scenarios, a data write command can comprise data to be written to the storage medium 125. Additionally or alternatively, a data write command can comprise a command to cause data that is stored in one storage location of the storage medium 125 to be written (e.g., duplicated, moved, etc.) to another storage location of the storage medium 125. In FIG. 1A, the group of data write commands 161 is depicted as comprising data write commands 141-145. However other numbers of data write commands are possible. Although the group of data write commands 161 are depicted as a sequence of data write commands 141-145 in FIG. 1A, in at least some embodiments the data write command 141-145 may not be transmitted sequentially by the host computer 110. For example, in at least some cases, the data write commands 141-145 can be interleaved with one or more other data access commands (e.g., data read commands, etc.). Additionally or alternatively, the group of data write commands 161 need not be expressly identified. For example, the data write commands 141-145 can be identified by the storage device controller 123 as a group of data write commands (161) based on the fact that they are received prior to receipt of a write barrier command (e.g., 151).

The storage device controller 123 can be configured to receive the group of data write commands 161 and to add the group of data write commands 161 to the command buffer 127. The command buffer 127 can comprise a plurality of storage locations where data access commands (e.g., data write commands, data read commands, etc.) are temporarily buffered before being processed by the storage device controller 123. For example, data access commands (e.g., the data write command 141-145) can be received at a rate faster than they can be processed by the storage device controller 123. In order to avoid loss of the data access commands, the storage device controller 123 can store the data access commands in the command buffer 127. The storage device controller 123 can process data access commands from the command buffer 127. In at least some embodiments, the storage device controller 123 can be configured to store all received data access commands in the command buffer 127 and to process data access commands exclusively from the command buffer 127. Alternatively, the storage device controller 123 can be configured to bypass the command buffer in certain scenarios, such as the receipt of a high priority data access command and/or times that the data processing load of the storage device is low enough that the buffering of data access commands is not necessary. In at least some embodiments, the command buffer 127 can comprise a plurality of storage locations in the storage medium 125 where data access commands are temporarily stored. Additionally or alternatively, all or part of the command buffer 127 can be stored in another storage medium of the storage device 120 (such as a memory of the storage device 120, etc.).

The host computer 110 can be configured to transmit the write barrier command 151 to the storage device 120. Subsequent to receiving the write barrier command 151, the storage device controller 123 can associate a write barrier with the group of data write commands 161. Associating the write barrier with the group of data write commands 161 can comprise tracking a relationship between the write barrier command 151 and the data write commands 141-145 in the group of data write commands 161. In at least some embodiments, the storage device 120 can associate the write barrier command 151 with the group of data access commands 161 by adding the write barrier command 151 to the command buffer 127 in a position following a position of the data write commands 141-145. Additionally or alternatively, the storage device controller 123 can use a record 130 to track the association between the write barrier command 151 and the data write commands 141-145. Although the record 130 is depicted in FIG. 1A as being part of the storage device controller 123, in at least some embodiments the record 130 can be stored in the storage medium 125 or another storage medium of the storage device 120 (such as a memory (not shown) of the storage device 120).

In at least some embodiments, the write barrier command 151 is used by the storage device controller 123 to identify the data write commands in a group of data write commands. For example, the storage device controller 123 can determine that the data write commands 141-145 belong to the group of data write commands 161 that is associated with the write barrier command 151 based on a determination that the data write commands 141-145 were received prior to receipt of the write barrier command 151. In at least some such embodiments, write barrier commands (e.g., 151) can be used as delimiters between separate groups of data write commands.

The write barrier that is created based on the write barrier command 151 can be used to prevent the storage device controller 123 from processing any subsequently received data access commands before all of the data access commands associated with the write barrier have been processed. For example, FIG. 1B depicts a scenario in which the host computer 110 transmits a second group of data write commands 163 (comprising data write commands 147-149) to the storage device 120. The storage device controller 123 can be configured to add the second group of data write commands to the command buffer 127 and to process the first group of data write commands 161 associated with the write barrier before processing the second group of data write commands 163.

For example, the storage device controller 123 can be configured, in certain circumstances, to process data write commands in an order that is different from the order in which the data write commands are received. The host computer 110 can use a write barrier command to prevent the storage device controller 123 from processing certain data access commands before other data access commands. For example, the host computer 110 can transmit the write barrier command 151 after the group of data write commands 161 and before the group of data write commands 163 to cause the storage device controller 123 to process all of the data write commands 141-145 before processing any of the data write commands 147-149.

In at least some such embodiments, the storage device controller 123 can still process data access commands out of order, so long as any write barriers are honored. For example, the storage device controller 123 can process the data write commands 141-145 in the group of data write commands 161 in an order that is different from the order that the data write commands 141-145 are written to the command buffer. To illustrate, in the scenario depicted in FIGS. 1A-B, the data write command 141 is written to the command buffer 127 before the data write command 145. However, the storage device controller 123 can process the data write command 145 before processing the data write command 141. The storage device controller 123 can still honor the write barrier 151 in such a scenario, so long as both the data write command 141 and the data write command 145 (and any other data access commands that are a part of group 161) are processed before any of the subsequently received data write commands 147-149 are processed.

In at least some embodiments, different groups of data access commands can be associated with different zones of the storage medium 125. For example, the group of data write commands 161 can comprise data write commands (e.g., 141-145) that target storage locations in a first zone (not shown) of the storage medium 125. The group of data write commands 163 can comprise data write commands (e.g., 147-149) that target storage locations in a second zone (not shown) of the storage medium 125. In at least some such embodiments, the host computer 110 can be configured to use the write barrier 151 to separate processing of data access commands associated with the different storage zones of the storage medium 125. For example, the host computer 110 can determine that the data write commands 141-145 target storage locations in a first zone of the storage medium 125 and that the data write commands 147-149 target storage locations in a second zone of the storage medium 125. The host computer 110 can transmit the write barrier command 151 after transmitting the data write commands 141-145, and before transmitting the data write commands 147-149, in order to ensure that the storage device controller 123 will process the data write commands 141-145 targeting the first zone of the storage medium 125 before processing the data write commands 147-149 targeting the second zone of the storage medium 125.

In at least some embodiments, the storage device controller 123 can be configured to, subsequent to processing the group of data write commands 161, transmit a message 171 indicating that the write barrier command 151 has been processed. In some such embodiments, the message 171 can comprise a number of data access commands that were processed by the storage device controller 123. For example, the storage device controller 123 can determine a number of data access commands associated with the write barrier command 151 (e.g., data write commands 141-145) that have been processed by the storage device controller 123. The storage device controller 123 can then transmit the number of data access commands to the host computer 110 as part of the message 171. Additionally or alternatively, the storage device controller 123 can store the number of data access commands in the storage device 120 (for example, in storage location of the storage medium 125, in another storage medium of the storage device 120, in a register of the storage device controller 123, etc.). The host computer 110 can be configured to read the number of data access commands from the storage location of the storage device 120. For example, in response to receiving the command 171, indicating that the write barrier command 151 has been processes, the host computer 110 can inspect the storage location of the storage device 120 to determine the number of data access commands that were associated with a write barrier and have now been processed.

The storage device controller 123 can be configured to also transmit a response (not shown) to the host computer 110 after receiving the write barrier command 151, indicating that the write barrier command 151 has been received but that processing of the write barrier command is not complete. The message 171 can indicate to the host computer 110 that all data access commands (e.g., data write commands 141-145) that are associated with the write barrier command 151 have been processed.

The host computer 110 can be configured to use the message 171 to determine that one or more garbage collection operations targeting the storage device 120 have completed. For example, the group of data write commands 161 can be transmitted by the host computer 110 as part of one or more garbage collection operations. Such garbage collection operations can include operations to relocate data from one or more storage locations on the storage medium 125 to one or more other storage locations on the storage medium 125 and/or one or more other storage locations on one or more other storage media (not shown) of the storage device 120. The host computer 110 can be configured to perform such garbage collection operations in order to improve the organization of data on the storage medium 125 (and/or one or more other storage media of the storage device 120). Such garbage collection operations can comprise defragmentation operations, data compaction operations, data compression operations, zone reclamation operations, etc. In such an embodiment, the host computer 110 can be configured to receive the message 171 from the storage device controller 123, indicating that the write barrier command 151 has been processed. Responsive to receiving the message 171 the host computer 110 can determine that the one or more garbage collection operations associated with the group of data write command 161 is complete. In at least some such embodiments, the host computer 110 can use the write barrier command 151 to ensure that subsequent data access operations targeting the data that is targeted by the one or more garbage collection operations are not processed until after the garbage collection operations have been completed. For example, the host computer 110 can determine that the data write commands 147-149 target data that are affected by one or more of the data write commands 141-145 associated with the one or more garbage collection operations. The host computer 110 can transmit the write barrier command 151 before transmitting the data write commands 147-149 in order to guarantee that the data write commands 141-145 associated with the garbage collection operations will be processed by the storage device controller 123 before any of the data write commands 147-149 are processed.

Optionally, the host computer 110 can be configured to transmit a command (not shown) to the storage device 120 to abort the write barrier command 151. The storage device controller 123 can receive the command and abort the write barrier command 151 by removing the write barrier. For example, the storage device controller 123 can be configured to remove the write barrier command 151 from the command buffer 127. Additionally or alternatively, the storage device controller 123 can be configured to delete all or part of the record 130 associated with the write barrier command 151.

In any of the examples described herein, a storage device can be a device capable of storing data in one or more physical storage media. For example, the storage device can be a magnetic storage device, such as a hard disk drive or tape drive, that is capable of storing data in one or more magnetic recording formats. Other examples of storage devices include optical storage devices, flash storage devices (such as NAND-type flash devices and NOR-type flash devices), and random access data storage devices (such as DRAM devices). Further examples of storage devices include non-volatile dual in-line memory modules (NVDIMMs). A storage medium can persistent or non-persistent. Examples or persistent storage media include magnetic storage media, optical storage media, and flash storage media. Examples of non-persistent storage media include volatile memories.

In some embodiments, the storage device comprises multiple storage media. For example, the storage device can be a hard disk drive that comprises a plurality of magnetic disks, a tape drive that can access a plurality of magnetic tape media, an optical drive that can access a plurality of optical media, a flash storage device that can access a plurality of flash media (e.g., a solid state drive (SSD)), etc. In at least some such embodiments, a storage device can comprise multiple disparate media, such as a storage device that comprises solid state storage and magnetic storage. In another example the storage device comprises multiple magnetic disks organized as a Redundant Array of Independent Disks (RAID). Other combinations of disparate storage media are also possible.

A storage device can comprise a command buffer where data access commands can be stored temporarily. In at least some embodiments, the command buffer can be stored in a non-persistent storage medium of the storage device.

In any of the examples described herein, a storage device controller can comprise one or more hardware components of a storage device. The storage device controller can be configured to access a firmware stored in a read-only memory (ROM) of the device, a storage medium of the device, or some combination thereof. Additionally or alternatively, the storage device controller can be implemented at an intermediate layer between an application and the device. Such an intermediate layer controller can comprise software (such as a driver) and one or more processors, a system-on-chip (SoC), a field-programmable gate array (FPGA), and/or an application-specific integrated circuit (ASIC). In some embodiments, the storage device controller can be part of an application. In such an embodiment, the application may use the storage device controller to access a storage device directly, without using an intermediate layer, such as a driver. The storage device controller can be located on a computer containing the device, or on a separate computer that is connected to the device via a communication channel, such as a computer network.

In any of the examples described herein, a host computer can be a server or other computing device that comprises a processor and is connected to a storage device. The host computer is connected to the storage device and is configured to transmit commands, such as processing commands, communication commands, data access commands (e.g., commands to perform data read and write operations, commands to move data from one storage location to another storage location, etc.), inquiry commands, firmware update commands, or the like, to the device. The host computer can be configured to receive command responses from the device. The connection can be a direct connection, such as a cable or bus connection, an indirect connection, such as a connection over a network, or some combination thereof. In scenarios where the host computer is connected to more than one device, the various connections can be of the same type or different types.

In some embodiments, the host computer can comprise a controller connected to multiple devices. In at least some embodiments, the host computer can be a computing device configured to provide a unified access point for multiple connected storage devices, such as a JBOD ("just a bunch of drives/disks") device, a RAID array controller, etc.

FIG. 2 is a flowchart of an example method 200 for processing a write barrier command. Any of the example systems described herein can be used to perform the example method 200. For example, the example storage device 300 depicted in FIG. 3 can be used to perform all or part of the example method 200.

Figure 3:
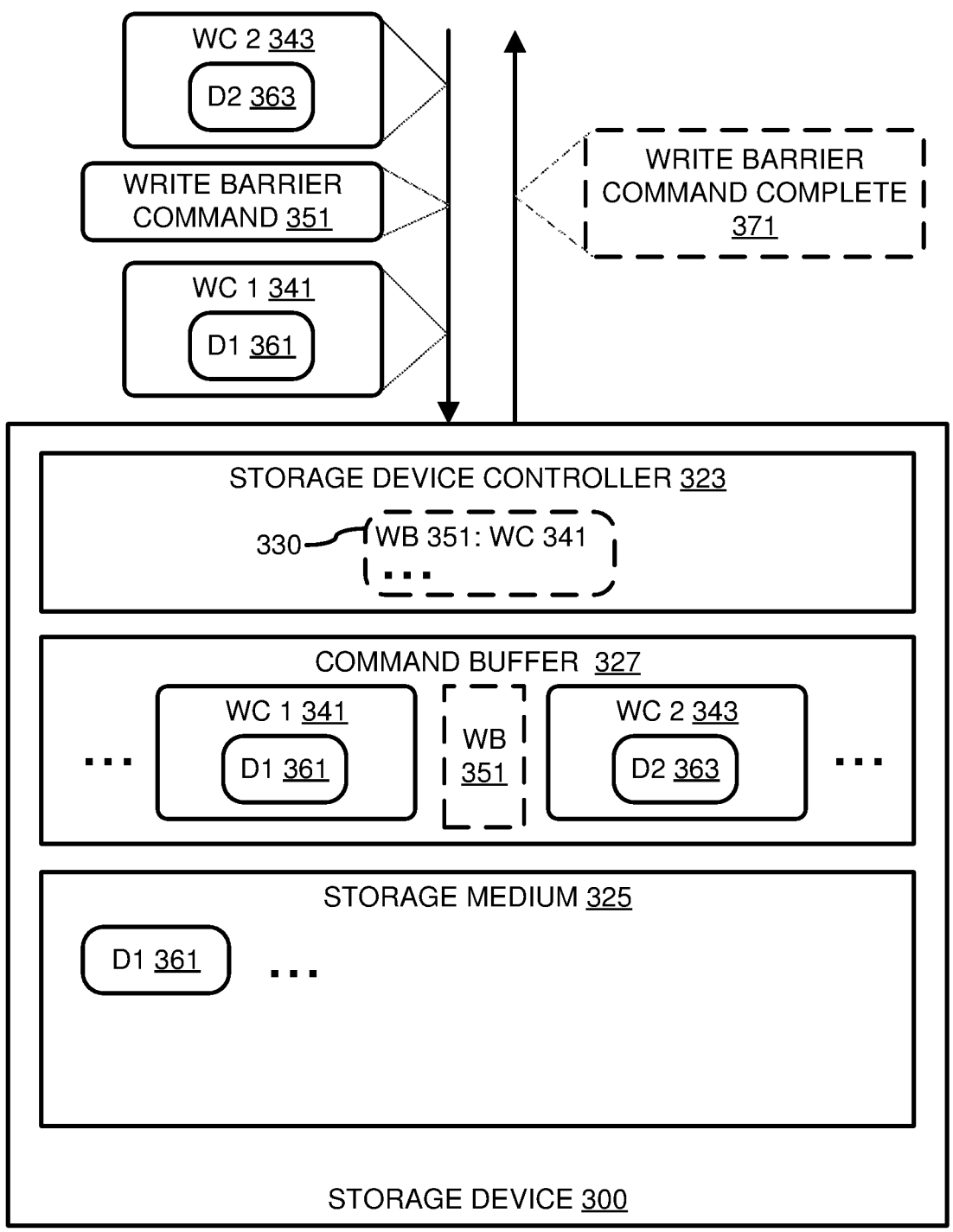
FIG. 3 is a diagram depicting an example storage device configured to process a write barrier command.

FIG. 3 is a diagram of an example storage device 300 configured to process a write barrier command 351. The storage device 300 comprises a storage device controller 323, a command buffer 327, and a storage medium 325. The storage device controller 323 can be configured to receive data access commands (e.g., data write commands 341 and 343) and to process the received data access commands by retrieving data from and/or writing data to the storage medium 325. In at least some scenarios, the storage device controller 323 is configured to temporarily store data access commands in the command buffer 327 before processing them.

At 210 a first data write command is stored in a command buffer associated with a storage device. The command buffer can be part of a storage medium of the storage device and/or part of one or more storage media in one or more other storage devices and/or computing devices (such as a host bus adapter connected to the storage device). For example, referring to FIG. 3, the storage device controller 323 can be configured to receive the data write command 341 and to store the data write command 341 in the command buffer 327. The data write command 341 can target one or more storage locations of the storage medium 325 for data storage operations. In at least some scenarios, the data write command 341 can comprise data 361 to be written to a storage location of the storage medium 325.

At 220, a write barrier command is received at the storage device. For example, referring to FIG. 3, the storage device controller 323 can be configured to receive the write barrier command 351. The write barrier command can be an instance of a command that is defined as part of a communication protocol that is supported by the storage device 300. In at least some embodiments, the write barrier command can comprise a buffer flush command. For example, the write barrier command 351 can comprise a buffer flush command. However, rather than flushing the command buffer 327, the storage device controller 323 can be configured to process the buffer flush command by creating a write barrier. In at least some such embodiments, the storage device controller 323 can be initialized in a mode in which buffer flush commands are treated as write barrier commands. Additionally or alternatively, the write barrier command 351 can comprise an indicator (such as a flag value or the like) that indicates that the buffer flush command should be treated as a write barrier command.

At 230, a write barrier is associated with the first data write command in the command buffer. Subsequent to receiving the write barrier command at 220, the storage device can process the write barrier command by creating a write barrier and associating it with the first data write command. For example, referring to FIG. 3, the storage device controller 323 can process the write barrier command 351, wherein the processing comprises associating a write barrier with the data write command 341 and the command buffer 327. Associating the write barrier with the first data write command in the command buffer can comprise storing the write barrier command in the command buffer in a position following a position of the first data write command in the command buffer. For example, the storage device controller 323 can associate the write barrier with the data write command 341 by storing the write barrier command 351 in a position of the command buffer 327 that follows a position of the data write command 341 in the command buffer 327.

Additionally or alternatively, associating the write barrier with the first data write command can comprise creating a record that associates the write barrier with the first data write command. For example, the storage device controller 323 can be configured to create a record 330 that associates the write barrier with the data write command 341. In at least some embodiments, the record 330 can associate the write barrier command 351 with the data write command 341. The storage device controller 323 can be configured to store the record 330 in the storage medium 325 for another storage medium (not shown) of the storage device 330 (such as a memory, etc.).

At 240, a second data write command is stored in the command buffer associated with the storage device. For example, referring to FIG. 3, the storage device controller 323 can be configured to receive the data write command 343. The storage device controller 323 can store the data write command 343 in the command buffer 327. The data write command 343 can target one or more storage locations of the storage medium 325. The one or more storage locations can comprise one or more of the storage locations targeted by the data write command 341. Additionally or alternatively, the data write command 343 can target one or more different storage locations of the storage medium 325. In at least some embodiments, the data write command 343 comprises a data 363 to be stored in the storage medium 325. In an embodiment where the storage device controller adds the write barrier command 351 to the command buffer 327, the storage device controller 323 can be configured to store the data write command 343 in a position in the command buffer 327 that follows the position of the write barrier command 351 in the command buffer 327. By organizing the commands in the command buffer 327 in this way, it can be ensured that the storage device controller 323 will not process the data write command 343 until after completion of the processing of the write barrier 351, and any preceding data write commands in the command buffer (e.g., 341).

Referring to FIG. 2, at 250, the first data write command associated with the write barrier is processed before processing the second data write command. For example, referring to FIG. 3, the storage device controller 323 can be configured to process the data write command 341 associated with the write barrier (for example, by storing the data 361 in the storage medium 325). The storage device controller 323 can be configured to process the data write command 343 only after the processing of the data write command 341 associated with the write barrier is complete. Thus, in at least some scenarios, a write barrier command can be used to ensure that one or more data write commands are processed before any subsequent data access commands are processed by the storage device.

In at least some embodiments, the example method 200 can further comprise storing a plurality of data write commands, including the first data write command, in the command buffer of the storage device before receiving the write barrier command. In such an embodiment, the write barrier can be associated with the plurality of data write commands in the command buffer and the plurality of data write commands can be processed before the processing of the second data write command. For example, the storage device controller 323 can be configured to receive a group of data write commands (not shown) that comprises the data write command 341. The group of data write commands can be stored in the command buffer 327. When the write barrier command 351 is received, the storage device controller 323 can associate the write barrier with the group of data write commands in the command buffer 327. The storage device controller 323 can be configured to ensure that the group of data write commands, including the data write command 341, associated with the write barrier is processed before the processing of the data write command 343. In at least some embodiments, the group of data write commands can be associated with the write barrier by storing the group of data write commands in positions in the command buffer 327 preceding the position of the write barrier command 351 in the command buffer 327. As data access commands are processed from the command buffer 327, the relative positions of the group of data write commands and the write barrier command 351 can indicate to the storage device controller 323 that the group of data write commands should be processed before any data access commands (e.g., the data write command 343) that follow(s) the write barrier command 351 in the command buffer 327.

In at least some embodiments, storing the plurality of data write commands can comprise storing the plurality of data write commands in the command buffer in a first order, and processing the plurality of data write commands can comprise processing the plurality of data write commands in a second, different order. For example, the storage device controller 323 can be configured to process data write commands in an order that is different from the order in which the data write commands are received. In such an embodiment, the storage device controller 323 can be configured to store the group of data write commands in the command buffer 327 and a first order and to process the group of data write commands from the command buffer 327 in a second order that is different from the first order.

In at least one embodiment, the first and second data write commands can target different zones of the storage device. For example, the first data write command can comprise a command to write data to a first zone of the storage device, and the second data write command can comprise a command to write data to a second zone of the storage device. For example, the data write command 341 can target a storage location in a first zone (not shown) of the storage medium 325 and the data write command 343 can target a storage location in a second zone (not shown) of the storage medium 325. Additionally or alternatively, processing the data write command 341 can comprise moving data from one zone of the storage medium 325 to another zone of the storage medium 325.

In a different or further embodiment, subsequent to processing the first data write command, a notification can be transmitted that indicates that the write barrier command has been processed. For example, the storage device controller 323 can be configured to transmit a message 371, indicating that the write barrier command 351 is complete, subsequent to processing the data write command 341 associated with the write barrier. The storage device controller 323 can be configured to determine that all data access commands associated with the write barrier have been processed and, based on the determination, can transmit the completion message 371.

Figure 4:
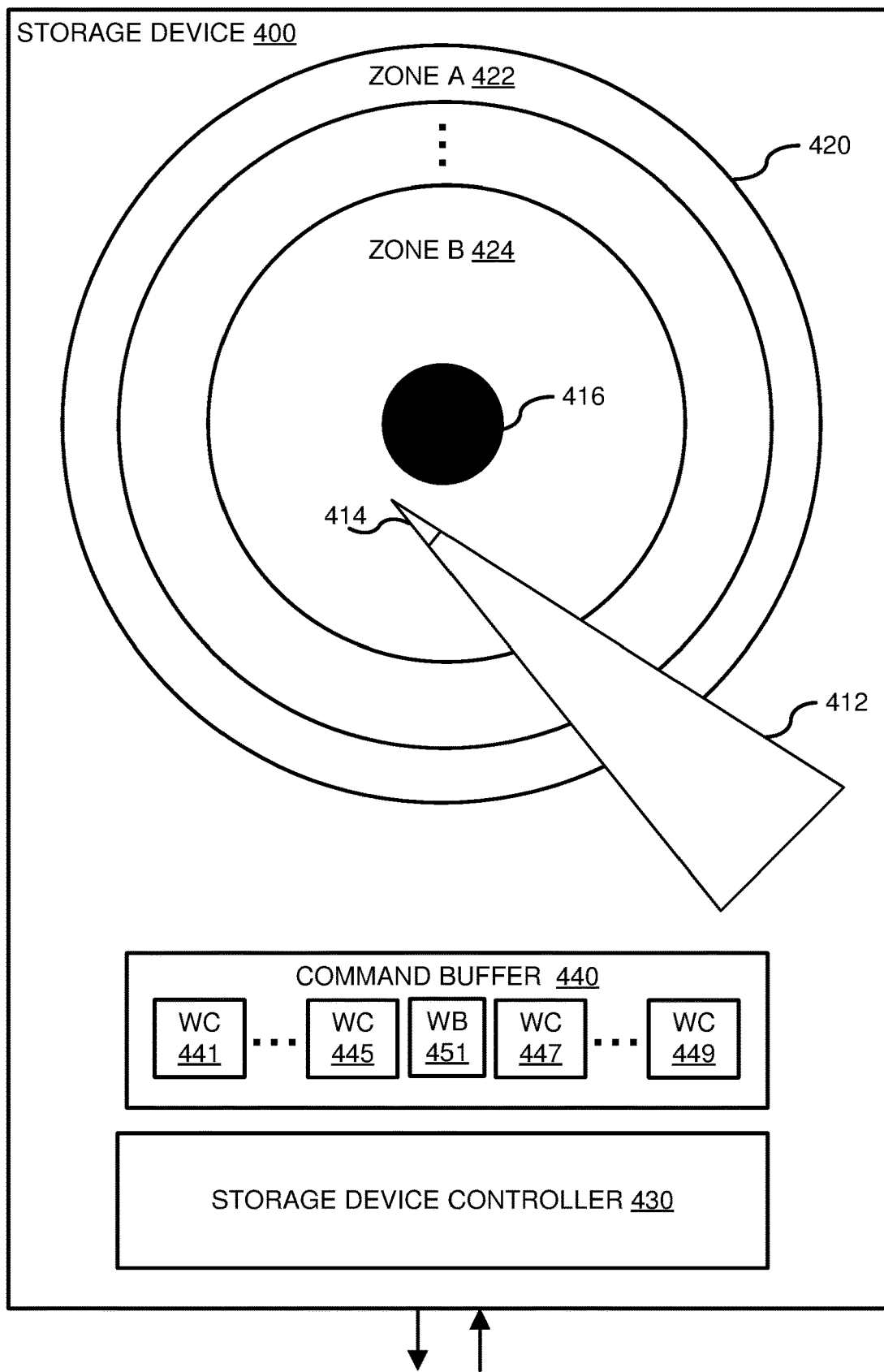
FIG. 4 is a system diagram depicting an example storage device configured to process a write barrier.

FIG. 4 is a system diagram depicting an example storage device 400 configured to process a write barrier (e.g., 451). The example storage device 400 can be used as a storage device in any of the examples described herein.

The storage device 400 comprises a magnetic disk 420 that can be rotated on a spindle 416. The storage device 400 also comprises a moveable actuator arm 412 with a read/write head 414. The actuator arm 412 can be rotated on an actuator axis (not shown) by an actuator (not shown) to move the read/write head 414 over different portions of the magnetic disk 420. The storage device 400 is configured to write data to, and read data from, the magnetic disk 420 using the read/write head 414. The read/write head 414 can comprise a single head that can perform both read and write operations. Alternatively, the read/write head 414 can comprise two separate heads for reading and writing, respectively. The storage device 400 can be configured to use the read/write head 414 to write data to the magnetic disk 420 in multiple concentric circular tracks as the magnetic disk is rotated on the spindle 416.

The storage device 400 comprises a storage device controller 430. The storage device controller 430 can be configured to process data access commands (e.g., data read commands, data write commands, etc.) that are transmitted to the storage device 400. Example data write commands include data write commands 441, 445, 447, and 449. The storage device controller 430 can process data read and write commands by reading data from, and writing data to, the magnetic disk 420, respectively. The storage device controller 430 can specify locations on the magnetic disk 420 at which data is to be written or from which data is to be read. For example, units of data stored on the magnetic disk 420 can have unique addresses, such as LBAs, that identify locations on the magnetic disk 420 where data is stored.

The storage device controller 430 can be configured to store at least some received data access commands (e.g., 441-445, and 447-449) in a command buffer 440 prior to processing the commands. Although only data write commands (441, 445, 447, and 449) are depicted in FIG. 4, in at least some embodiments the storage device controller can store other types of data access commands (such as data read commands, data move commands, etc.) in the command buffer 440 as well. Write barriers (e.g., 451) can be inserted into the command buffer 440 to identify data access commands in the command buffer that should be processed by the storage device controller 430 before other data access commands in the command buffer are processed. For example, the write barrier 451 can indicate an "all before any" relationship between the data access commands preceding the write barrier 451 (441-445) and the data access commands following the write barrier 451 (447-449), meaning that all of the data write commands 441-445 should be processed before any of the data write commands 447-449 are processed. In at least some embodiments, the storage device controller can process the data access commands preceding the write barrier 451 in a different order than the order that the data access commands are stored in the command buffer 440, so long as all of the data access commands that precede the write barrier 451 are processed before any of the data access commands that follow the write barrier 451.

Although the write barrier 451 is depicted in FIG. 4 as being stored in the command buffer 440, in at least some embodiments, the write barrier can be associated with the data write commands 441-445 using a separate record (not shown) instead of an entry in the command buffer 440. Such a record can be stored on the magnetic disk 420 or another storage medium of the storage device 400.

The storage device controller 430 can designate separate zones 422-424 on the magnetic disk 420, in which data can be stored. A zone can comprise all or part of one or more circular tracks of the magnetic disk 420. In at least some embodiments, data is written to the storage zones 422-424 as separate units. For example, in an embodiment where data is written to the magnetic disk 420 using a shingled magnetic recording (SMR) format, buffer areas can be placed between the zones 422-424 so that separate zones can be targeted by write operations. (Due to the overlapping nature of SMR formats, updating data can require rewriting data that is "overlapped" by the data being updated. By separating the magnetic disk 420 into zones, only the zone containing the updated data needs to be rewritten.)

In at least some embodiments, where data is stored on the magnetic disk 420 using a non-SMR format (such as a perpendicular magnetic recording (PMR) format), the storage device controller can be configured to use write barriers to emulate the behavior of SMR. For example, the storage device controller can be configured to use write barriers to emulate zone divisions (e.g., for zones 422-424) on the magnetic disk 420. Such emulation can comprise using write barriers (e.g., 451) in the command buffer 440 to organize pending data write commands (e.g., 441-445 and 447-449) into groups according to zones that are targeted by the commands. For example, the storage device controller 430 can be configured to determine that the data write commands 441-445 target storage locations in tracks of the magnetic disk 420 that are associated with zone 422. Based on that determination, the storage device controller can use the write barrier 451 in the command buffer 440 to group the data write commands targeting zone 422 (441-445) together.

By using the write barrier 451 to separate the data write commands 441-445 from other data write commands in the command buffer 440 (e.g., 447-449), the storage device controller 430 it can be ensured that data access commands targeting zone 422 will be processed as a group before subsequent data access commands in the command buffer 440 (e.g., 447-449) are processed. By using write barriers to organize write commands based on zones, in at least some cases, traversal of the actuator arm 412 between the zones 422-424 on the magnetic disk 420 can be reduced. This can lead to a more efficient processing of data access commands.

In a different or further embodiment, a host computer (not shown) that is connected to the storage device 400 can be configured to organize data access commands (e.g., 441-445 and 447-440) sent to the storage device 400 based on related zones. For example, the storage device controller 430 may be configured to process data access commands in a different order than the order in which they are received. The storage device controller 430 may do this based on an algorithm that prioritizes certain data access commands over others. For example, the storage device controller 430 may process a later-received data access command before processing an earlier-received data access command because the later-received data access command targets a storage location on the magnetic disk 420 that is relatively closer to a current position of the read/write head 414 than a storage location targeted by the earlier-received data access command. However, a connected host computer may be able to identify relationships among pending data access commands that the storage device controller 430 is not able to identify. For example, the host computer can be configured to organize a batch of data write commands into groups based on zones (e.g., 422-424) of the magnetic disk 420 that are targeted by the data access commands. The host computer may wish to have these group boundaries respected by the storage device controller 430 so that the batch of data access commands is processed a zone at a time in order to avoid thrashing of the actuator arm 412. In at least some cases, doing this can improve the overall data access time for the batch of data access commands.

However, even if the host computer transmitted the batch of data access commands to the storage device 400 in an order based on the zone groups, there is no guarantee that the storage device controller 430 would process the commands in this order since the storage device controller 430 may process data access commands in a different order than the order in which they are received. The host computer can prevent this by using write barriers to separate the groups of data access commands. In at least some such embodiments, the host computer can be configured to transmit write barrier commands (not shown) to the storage device controller 430 that cause the storage device controller 430 to insert write barriers (e.g., 451) between the groups of data access commands (e.g., 441-445 and 447-449) in the command buffer 440. For example, the host computer can determine that the data write commands 441-445 target storage locations on the magnetic disk 420 that are associated with the storage zone 422 and that the data write commands 447-449 target storage locations on the magnetic disk 420 that are associated with the storage zone 424. The host computer can then transmit the data write commands 441-445 to the storage device 400, followed by a write barrier command (not shown). This can cause the storage device controller to add the write barrier 451 to the command buffer 440 following the data write commands 441-445. The host computer can then transmit the data write commands 447-449 to the storage device 400 and the storage device controller 430 can store the data write commands 447-449 in the command buffer 440 following the write barrier 451.

The storage device controller 430 can be configured to respect the write barrier 451 when processing the data write commands 441-445 and 447-449 from the command buffer 440 and, thus, to process all of the data write commands 441-445 before processing any of the data write commands 447-449. This can cause the storage device controller 430 to process all data access commands related to zone 422 before processing any data access commands related to other zones (e.g., 424).

Figure 5:
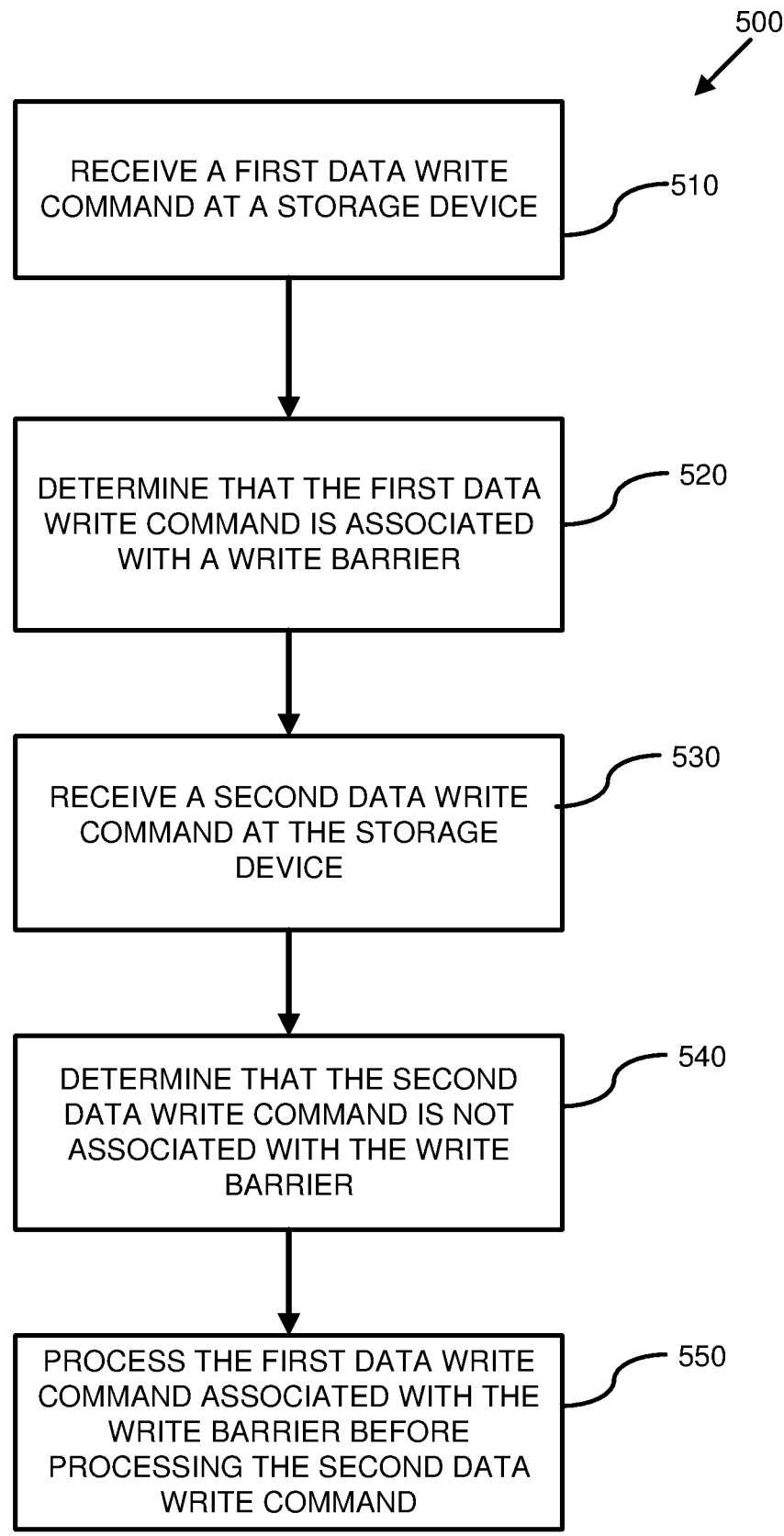
FIG. 5 is a flowchart of an example method for associating a data write command with a write barrier.

FIG. 5 is a flowchart of an example method 500 for associating a data write command with a write barrier. Any of the example systems described herein can be used to perform the example method 500. For example, the example storage device 600 depicted in FIG. 6 can be used to perform all or part of the example method 500.

Figure 6:
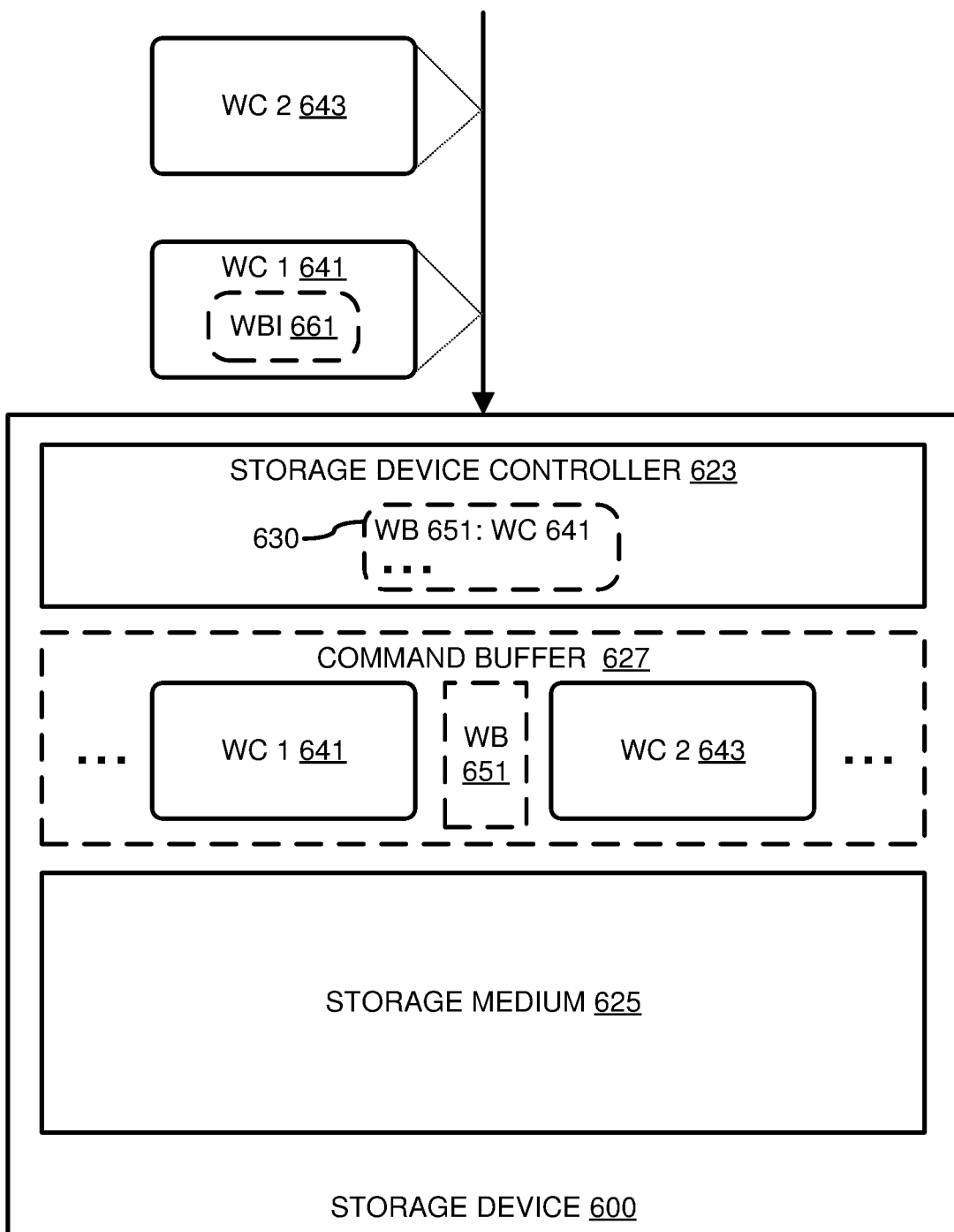
FIG. 6 is a diagram depicting an example storage device configured to associate a data write command with a write barrier.

FIG. 6 is a diagram depicting an example storage device 600 configured to associate a data write command 641 with a write barrier. The storage device 600 comprises a storage medium 625 and a storage device controller 623. Optionally, the storage device 600 can comprise a command buffer 627.

At 510, a first data write command is received at a storage device. For example, the storage device controller 623 can be configured to receive a data write command 641. The data write command 641 can be received from a host computer (not shown) connected to the storage device 600. In at least some embodiments, the storage device 600 comprises the command buffer 627. In such embodiments, the storage device controller 623 can store the data write command 641 in the command buffer 627.

At 520, it is determined that the first data write command is associated with a write barrier. In at least some embodiments, determining that the first data write command is associated with a write barrier comprises determining that the first data write command comprises a write barrier identifier. For example, the data write command 641 can comprise a write barrier identifier 661. The write barrier identifier 661 can be associated with a write barrier (e.g., 651) that is managed by the storage device controller 623.

In at least some embodiments, the example method 500 further comprises receiving a write barrier command comprising a write barrier identifier before receiving the first data write command. In such an embodiment, the write barrier indicator in the first data write command can comprise the write barrier identifier. For example, the storage device controller 623 can be configured to receive a write barrier command (not shown) comprising a write barrier identifier. The write barrier indicator 661 can comprise the write barrier identifier. Additionally or alternatively, the write barrier indicator 661 can be stored in a header field of the data write command 641.

In at least some embodiments, the storage device controller 623 can be configured to create the write barrier 651 in response to detecting the write barrier indicator 661 in the data write command 641. In an embodiment where the storage device controller 623 is configured to receive a data write command, the storage device controller can be configured to create the write barrier as part of processing the write barrier command. In an embodiment where the storage device controller 623 is configured to store the data write command 641 in the command buffer 627, the storage device controller can be configured to add the write barrier 651 in the command buffer 627. Additionally or alternatively, the storage device controller 623 can be configured to create a record 630 associating the data write command 641 with the write barrier 651.

At 530, a second data write command is received at the storage device. For example, the storage device controller 623 can be configured to receive a data write command 643. The data write command 643 can receive the data write command 641 and the data write command 643 from a same computing device or different computing devices.

At 540, it is determined that the second data write command is not associated with the write barrier. Determining that the second data write command is not associated with the write barrier can comprise determining that the second data write command does not comprise a write barrier indicator. For example, the storage device controller 623 can determine that the data write command 643 does not contain the write barrier indicator 661.

At 550, the first data write command that is associated with the write barrier is processed before the second data write command that is not associated with the write barrier. For example, the storage device controller 623 can be configured to process the data write command 641 associated with the write barrier 651 before processing the data write command 643.

In at least some embodiments, the example method 500 comprises receiving a plurality of data access commands, including the first data write command, at the storage device. The example method 500 can comprise determining that the plurality of data access commands are associated with the write barrier and processing the plurality of data access commands associated with the write barrier before processing the second data write command. In such an embodiment, determining that the plurality of data access commands are associated with the write barrier comprises determining that each of the data access commands comprises a write barrier indicator.

For example, the storage device controller 623 can be configured to receive a group of data write commands (not shown) including the data write command 641. The storage device controller 623 can be configured to determine that the group of data write commands are associated with the write barrier 651 and to process the group of data write commands associated with the write barrier before processing the data write command 643.

In at least some embodiments, determining that the plurality of data write commands comprises determining that each of the data access commands comprises a write barrier indicator. For example, the storage device controller 623 can be configure to determine that each data write command comprises a write barrier indicator (such as the write barrier indicator 661).

The plurality of data access commands can be received in a first order and processed in a second order that is different from the first order. For example, the storage device controller 623 can be configured to receive a group of data write commands associated with a write barrier in one order and process the group of data write commands in another order.

In at least some embodiments, the first data write command targets a storage location in a first zone of the storage device and the second data write command targets a storage location in a second zone of the storage device. The first data write command can be associated with the write barrier to ensure that the data write command targeting the first storage zone is processed by the storage device before the data write command targeting the second storage zone.

Optionally, the example method 500 can comprise transmitting a notification indicating that the write barrier is complete subsequent to processing the first data write command associated with the write barrier. For example, the storage device controller 623 can be configured to transmit a notification (not shown) indicating that the write barrier 651 is complete after processing the data write command 641 associated with the write barrier. In an embodiment where a plurality of data access commands are associated with the write barrier 651, the storage device controller 623 can be configured to transmit the notification after processing all the data access commands associated with the write barrier 651.

Figure 7:
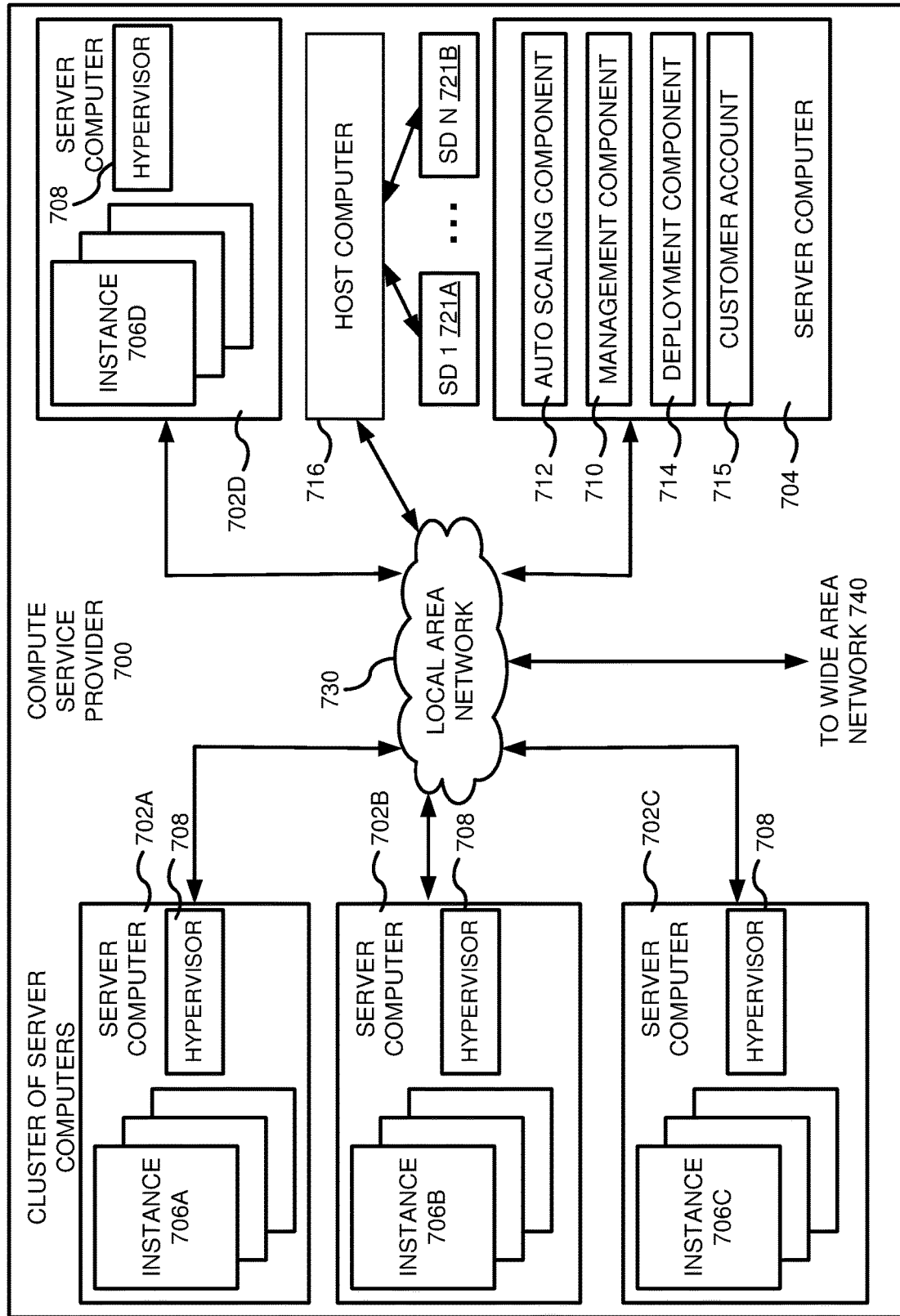
FIG. 7 is an example system diagram depicting a plurality of virtual machine instances, a host computer, and a plurality of storage devices running in a multi-tenant environment.

FIG. 7 is a computing system diagram of a network-based compute service provider 700 that illustrates one environment in which embodiments described herein can be used. By way of background, the compute service provider 700 (i.e., the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of customers operate independently (i.e., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. Additionally or alternatively, virtualization and/or process isolation can be achieved without the use of a hypervisor (for example, through the use of one or more virtualization containers).

The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

The particular illustrated compute service provider 700 includes a plurality of server computers 702A-702D. While only four server computers are shown, any number can be used, and large centers can include thousands of server computers. The server computers 702A-702D can provide computing resources for executing software instances 706A-706D. In one embodiment, the instances 706A-706D are virtual machines. As known in the art, a virtual machine is an instance of a software implementation of a machine (i.e. a computer) that executes applications like a physical machine. In the example, each of the servers 702A-702D can be configured to execute a hypervisor 708 or another type of program configured to enable the execution of multiple instances 706 on a single server. For example, each of the servers 702A-702D can be configured (e.g., via the hypervisor 708) to support one or more virtual machine slots, with each virtual machine slot capable of running a virtual machine instance (e.g., server computer 702A could be configured to support three virtual machine slots each running a corresponding virtual machine instance). Additionally, each of the instances 706 can be configured to execute one or more applications.

It should be appreciated that, although the embodiments disclosed herein with respect to compute service provider 700 are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances. The embodiments disclosed herein might also execute all or a portion of an application using other virtualization techniques (such as virtualization containers).

One or more server computers 704 can be reserved for executing software components for managing the operation of the server computers 702 and the instances 706. For example, the server computer 704 can execute a management component 710. A customer can access the management component 710 to configure various aspects of the operation of the instances 706 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 712 can scale the instances 706 based upon rules defined by the customer. In one embodiment, the auto scaling component 712 allows a customer to specify scale-up rules for use in determining when new instances should be instantiated and scale-down rules for use in determining when existing instances should be terminated. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist customers in the deployment of new instances 706 of computing resources. The deployment component can have access to account information associated with the instances, such as who is the owner of the account, credit card information, country of the owner, etc. The deployment component 714 can receive a configuration from a customer that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the customer-provided configuration and cache logic to configure, prime, and launch new instances 706. The configuration, cache logic, and other information may be specified by a customer using the management component 710 or by providing this information directly to the deployment component 714. The instance manager can be considered part of the deployment component.

Customer account information 715 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 730 can be utilized to interconnect the server computers 702A-702D and the server computer 704. The network 730 can comprise Clos networks or other types of multi-tiered network fabrics. The network 730 can be a local area network (LAN) and can be connected to a Wide Area Network (WAN) 740 so that end users can access the compute service provider 700. It should be appreciated that the network topology illustrated in FIG. 7 has been simplified and that many more networks and network devices can be utilized to interconnect the various computing systems disclosed herein.

A host computer 716 can be included in the compute service provider 700 to perform host computer-related operations as described herein. For example, the host computer 716 can be connected to one or more storage devices 721A-B. The one or more storage devices 721A-B can be configured perform data access operations and write-barrier-related operations as described herein. The host computer 716 can be configured to transmit data access commands and write barrier commands to the one or more storage devices 721A-B. In at least some embodiments the host computer 716 can be configured to provide a storage service that is accessible by the instances 706A-D via the network 730. Additionally or alternatively, the storage service can be accessible by other computer and services (not shown) via the wide area network 740 and the local area network 730. In at least some embodiments, the host computer 716 can be configured to provide all or part of a distributed storage service using the storage devices 721A-B.

Although the host computer 716 is depicted in FIG. 7 as separate from the server computers 702, in some embodiments, the host computer 716 can comprise one or more components of one or more of the server computers 702. For example, the host computer 716 can be a part of one or more of the instances 706.

Figure 8:
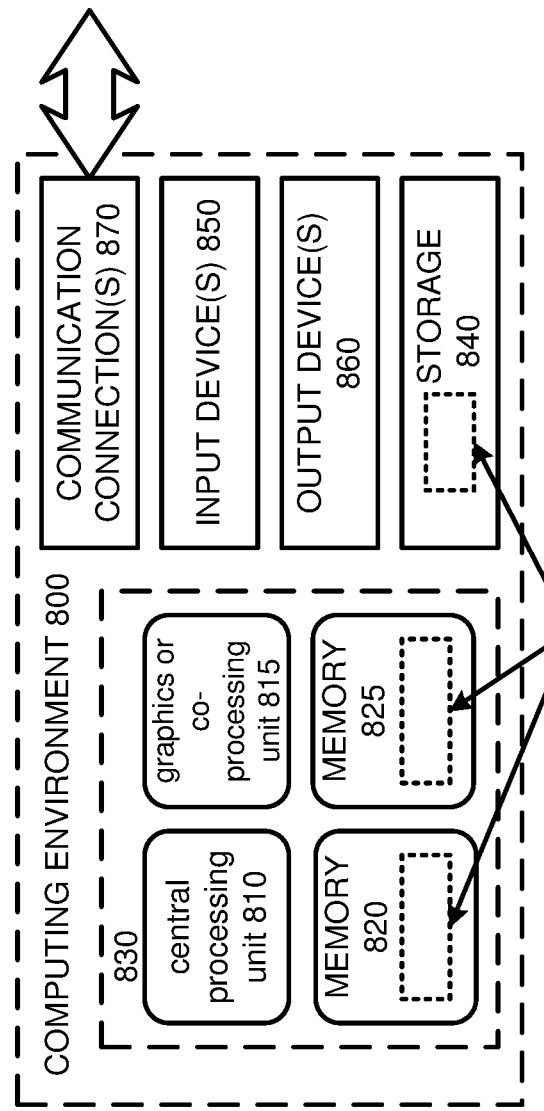
FIG. 8 is a diagram depicting a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 can store software 880 implementing one or more innovations described herein, (for example, in the form of computer-executable instructions suitable for execution by the processing unit(s)). In at least some embodiments, the computing environment 800 can comprise a computing device, server computer, or host computer as described herein.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 can store instructions for the software 880 implementing one or more innovations described herein (for example in a storage medium and/or firmware of the storage 840). In at least some embodiments, the tangible storage 840 can comprise one or more storage devices as described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-Specific Integrated Circuits (ASICs), Program-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system, comprising:
a host computer connected to a storage device, wherein the host computer is configured to:
  transmit a first group of data write commands to a storage device,
  transmit a write barrier command to the storage device, and
  transmit a second group of data write commands to the storage device;
the storage device, wherein the storage device comprises a storage medium, a command buffer, and a storage device controller, wherein the storage device controller is configured to:
  add the first group of data write commands to the command buffer,
  subsequent to receiving the write barrier command, associate a write barrier with the first group of data write commands,
  add the second group of data write commands to the command buffer, and process the first group of data write commands associated with the write barrier before processing the second group of data write commands; and
wherein the first group of data write commands is transmitted by the host computer as part of a garbage collection operation, and
the host computer is further configured to:
receive, from the storage device controller, a message indicating that the write barrier command has been processed, and
responsive to receiving the message, determine that the garbage collection operation is complete.

2. The system of claim 1, wherein the storage device controller is configured to:
process data write commands in the first group of data write commands in an order that is different from the order that the first group of data write commands are written to the command buffer.

3. The system of claim 1, wherein:
the first group of data write commands comprises data write commands that target storage locations in a first zone of the storage medium; and
the second group of data write commands comprises data write commands that target storage locations in a second zone of the storage medium.

4. A method, comprising:
storing a first data write command in a command buffer associated with a storage device;
receiving a write barrier command at the storage device;
associating a write barrier with the first data write command in the command buffer;
storing a second data write command in the command buffer associated with the storage device;
processing the first data write command associated with the write barrier before processing the second data write command; and
wherein the first data write command is part of a garbage collection operation, and
subsequent to processing the first data write command, transmitting a notification indicating that the write barrier command has been processed.

5. The method of claim 4, further comprising:
storing a plurality of data write commands, including the first data write command, in the command buffer of the storage device before receiving the write barrier command;
associating the write barrier with the plurality of data write commands in the command buffer; and
processing the plurality of data write commands associated with the write barrier before processing the second data write command.

6. The method of claim 5, wherein:
the storing the plurality of data write commands comprises storing the plurality of data write commands in the command buffer in a first order; and
the processing the plurality of data write commands comprises processing the plurality of data write command in a second order, wherein the second order is different from the first order.

7. The method of claim 4, wherein:
the first data write command comprises a command to write data to a first zone of the storage device; and
the second data write command comprises a command to write data to a second zone of the storage device.

8. The method of claim 4, wherein:
associating the write barrier with the first data write command in the command buffer comprises storing the write barrier command in the command buffer in a position following a position of the first data write command in the command buffer.

9. A storage device comprising:
a command buffer;
a storage medium; and
a storage device controller, wherein the storage device controller is configured to:
receive a first data write command targeting a storage location of the storage medium;
store the first data write command in the command buffer;
receive a write barrier command;
process the write barrier command, wherein the processing comprises associating a write barrier with the first data write command in the command buffer;
receive a second data write command targeting the storage location or a different storage location of the storage medium;
store the second data write command in the command buffer;
process the first data write command associated with the write barrier; and
process the second data write command only after the processing of the first data write command associated with the write barrier is complete and
the first data write command is part of a garbage collection operation, and subsequent to processing the first data write command associated with the write barrier, transmit a message indicating that the write barrier command is complete.

10. The storage device of claim 9, wherein the storage device controller is further configured to:
receive a group of data write commands, including the first data write command;
store the group of data write commands in the command buffer;
associate the write barrier with the group of data write commands in the command buffer; and
process the group of data write commands associated with the write barrier before the processing of the second data write command.

11. The storage device of claim 10, wherein:
the storing the group of data write commands comprises storing the group of data write commands in the command buffer in a first order; and
the processing the group of data write commands comprises processing the group of data write commands from the command buffer in a second order that is different from the first order.

12. The storage device of claim 9, wherein:
the first data write command targets a storage location in a first zone of the storage medium; and
the second data write command targets a storage location in a second zone of the storage medium.

13. The storage device of claim 9, wherein:
processing the first data write command comprises moving data from one zone of the storage medium to another zone of the storage medium.

14. The storage device of claim 9, wherein:
the associating the write barrier with the first data write command in the command buffer comprises storing the write barrier command in a position of the command buffer that follows a position of the first data write command in the command buffer.

15. One or more computer-readable storage media storing instructions that, when executed by a computing device, cause the computing device to perform operations, the operations comprising:
- transmitting a data write command to a storage device; and
- transmitting a write barrier command associated with the data write command to the storage device and wherein the data write command is part of a garbage collection operation; and
- receiving a response, from the storage device, indicating that the write barrier command has been processed, and, based on the response, determining that that processing of the data write command by the storage device is complete.

16. The one or more computer-readable storage media of claim 15, wherein the operations further comprise:
- transmitting another data write command to the storage device that is not associated with the write barrier command.

17. The one or more computer-readable storage media of claim 16, wherein the operations further comprise:
- determining that the data write command targets a first storage zone of the storage device and the another data write command targets a second storage zone of the storage device; and
- associating the write barrier command with the data write command and not the another data write command based on the determining.

18. The one or more computer-readable storage media of claim 17, wherein:
- the associating the write barrier command with the data write command and not the another data write command comprises transmitting the write barrier command subsequent to transmitting the data write command and prior to transmitting the another data write command.

19. The one or more computer-readable storage media of claim 15, wherein:
- the operations further comprise transmitting a group of data write commands, including the data write command, to the storage device; and
- the write barrier command is associated with the group of data write commands.

20. The one or more computer-readable storage media of claim 15, wherein:
- associating the write barrier command with the data write command comprises transmitting the write barrier command subsequent to transmitting the data write command.

21. The one or more computer-readable storage media of claim 15, wherein:
- the operations further comprise transmitting a data read command to the storage device; and
- the write barrier command is associated with the data write command and the data read command.

* * * * *